(12) United States Patent
Patterson et al.

(10) Patent No.: US 7,403,845 B2
(45) Date of Patent: Jul. 22, 2008

(54) CHILD SEAT MONITORING SYSTEM AND METHOD FOR DETERMINING A TYPE OF CHILD SEAT

(75) Inventors: James F. Patterson, Greentown, IN (US); Stuart S. Sullivan, Peru, IN (US); Duane D. Fortune, Lebanon, IN (US)

(73) Assignee: Delphi Technologies, Inc., Troy, MI (US)

( * ) Notice: Subject to any disclaimer, the term of this patent is extended or adjusted under 35 U.S.C. 154(b) by 181 days.

(21) Appl. No.: 11/146,939

(22) Filed: Jun. 6, 2005

(65) Prior Publication Data

US 2005/0278097 A1  Dec. 15, 2005

Related U.S. Application Data

(60) Provisional application No. 60/607,988, filed on Sep. 8, 2004, provisional application No. 60/577,546, filed on Jun. 7, 2004.

(51) Int. Cl.
*G06F 7/00* (2006.01)
(52) U.S. Cl. .................... 701/36; 701/45; 180/273; 280/734; 297/464; 297/468
(58) Field of Classification Search ............. 297/464, 297/468; 701/36, 45; 280/734; 180/273
See application file for complete search history.

(56) References Cited

U.S. PATENT DOCUMENTS

| | | | |
|---|---|---|---|
| 5,656,994 A | 8/1997 | Heninger | 340/457.1 |
| 5,711,574 A | 1/1998 | Barnes | 297/216.11 |
| 5,720,519 A | 2/1998 | Barnes | 297/216.11 |
| 6,151,540 A | 11/2000 | Anishetty | 701/45 |
| 6,246,936 B1 | 6/2001 | Murphy et al. | 701/45 |
| 6,272,936 B1 | 8/2001 | Oreper et al. | 73/862.621 |
| 6,371,516 B1 | 4/2002 | Miyagawa | 280/735 |
| 6,438,476 B1 | 8/2002 | Gray et al. | 701/45 |
| 6,480,616 B1 | 11/2002 | Hata et al. | |

(Continued)

OTHER PUBLICATIONS

Model-based management of embedded service systems-an applied approach; Illner, S.; Krumm, H.; Luck, I.; Pohl, A.; Bobek, A.; Bohn, H.; Golatowski, F.; Advanced Information Networking and Applications, 2006. AINA 2006. 20th International Conference on, vol. 2, Apr. 18-20, 2006 p. 5 pp.; Digital Object Identifier 10.1109/AINA. 2006.231.*

(Continued)

*Primary Examiner*—Cuong H. Nguyen
(74) *Attorney, Agent, or Firm*—Douglas D. Fekete

(57) ABSTRACT

A child seat monitoring system for a child seat and a method for determining a type of child seat are provided. The child seat has a first region and an opposite second region. The child seat has first and second patterns disposed on the first and second regions, respectively, both indicating whether the child seat is a forward-facing child seat or a rearward-facing child seat relative to a vehicle seat. The system includes a first detection apparatus configured to detect either the first pattern on the first region of the child seat or the second pattern on the second region of the child seat. The system further includes a controller operably communicating with the first detection apparatus. The controller is configured to generate a first signal when the child seat is a forward-facing child seat.

15 Claims, 15 Drawing Sheets

U.S. PATENT DOCUMENTS

| | | | |
|---|---|---|---|
| 6,490,936 B1 | 12/2002 | Fortune et al. | 73/862.581 |
| 6,554,318 B2 | 4/2003 | Kohut et al. | 280/801.1 |
| 6,578,871 B2 | 6/2003 | Gray et al. | 280/735 |
| 6,587,770 B1 | 7/2003 | Gray et al. | 701/45 |
| 6,605,877 B1 | 8/2003 | Patterson et al. | 307/10.1 |
| 6,644,689 B2 | 11/2003 | Murphy | 280/735 |
| 6,650,978 B1 | 11/2003 | Patterson et al. | 701/35 |
| 6,662,094 B2 | 12/2003 | Murphy et al. | 701/45 |
| 6,683,534 B2 | 1/2004 | Patterson et al. | 340/436 |
| 6,749,038 B2 | 6/2004 | Sullivan et al. | 180/268 |
| 6,796,192 B2 | 9/2004 | Sullivan et al. | 73/862.391 |
| 6,812,844 B1 | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,868,745 B2 | 3/2005 | Sullivan et al. | 73/862.391 |
| 6,889,146 B2 | 5/2005 | Sullivan et al. | 702/43 |
| 7,134,687 B2 | 11/2006 | Breed et al. | |
| 2004/0113797 A1 | 6/2004 | Osborne | |
| 2005/0030188 A1 | 2/2005 | Flanagan et al. | 340/667 |
| 2005/0090959 A1 | 4/2005 | Winkler | |

OTHER PUBLICATIONS

Occupant Classification Using Range Images; Devarakota, P.R.; Castillo-Franco, M.; Ginhoux, R.; Mirbach, B.; Ottersten, B.; Vehicular Technology, IEEE Transactions on, vol. 56, Issue 4, Part 2, Jul. 2007 pp. 1983-1993, Digital Object Identifier 10.1109/TVT.2007.897645.*

Smart Automotive Airbags: Occupant Classification and Tracking; Farmer, M.; Jain, A.; Vehicular Technology, IEEE Transactions on, vol. 56, Issue 1, Jan. 2007 pp. 60-80; Digital Object Identifier 10.1109/TVT.2006.883768.*

A treatise on crash sensing for automotive air bag systems; Ching-Yao Chan; Mechatronics, IEEE/ASME Transactions on vol. 7, Issue 2, Jun. 2002 pp. 220-234, Digital Object Identifier 10.1109/TMECH.2002.1011259.*

Occupant posture analysis with stereo and thermal infrared video: algorithms and experimental evaluation; Trivedi, M.M.; Shinko Yuanhsien Cheng; Childers, E.M.C.; Krotosky, S.J.; Vehicular Technology, IEEE Transactions on, vol. 53, Issue 6, Nov. 2004 pp. 1698-1712, Digital Object Identifier 10.1109/TVT.2004.835526.*

Video occupant detection for airbag deployment; Krumm, J.; Kirk, G.; Applications of Computer Vision, 1998. WACV '98. Proceedings., Fourth IEEE Workshop on; Oct. 19-21, 1998 pp. 30-35, Digital Object Identifier 10.1109/ACV.1998.732854.*

K. Kompab and M. Witte, "The BMW seat occupancy monitoring system: a step toward situation appropriate air bag deployment,", SAE Paper 960 226.*

C. Chan, "Integration of sensing technologies for occupant restraint systems," presented at the 2nd World Congr. Intelligent Transportation Systems, Yokohama, Japan, Nov. 1995.*

P. Faber. Seat Occupant Detection Inside Vehicles. In Proc. 4th IEEE Southwest Symposium on Image Analysis and Interpretation, Apr. 2-4, 2000.*

S. Lacroix S. Gautama and M. Devy. Evaluation of Stereo Matching algorithms for Occupant detection. In Proceedings of the international workshop on Recognition, Analysis, and Tracking of Faces and Gestures in Real-Time Systems, RATFG-RTS'99, pp. 177-184, 1999.*

Duda R. O. and Hart P. E.. Pattern Classification and Scene Analysis, Wiley, 1991.*

Paul J. Besl and Ramesh C. Jain. Three Dimensional Object Recognition. In ACM Computing Surveys (CSUR),, vol. 17, No. 1, pp. 75-145, Mar. 1985.*

Micronas, Mar. 2003, HAL 18xx, Low-Cost Programmable Linear Hall-Effect Sensor (2 pages).

Written Opinion of the International Searching Authority dated May 15, 2007 for PCT/US2005/20046.

International Search Report dated May 15, 2007 for PCT/US2005/20046.

* cited by examiner

US 7,403,845 B2

CHILD SEAT MONITORING SYSTEM AND METHOD FOR DETERMINING A TYPE OF CHILD SEAT

CROSS REFERENCE TO RELATED APPLICATIONS

The application claims the benefit of U.S. Provisional application Ser. No. 60/577,546, filed Jun. 7, 2004, the contents of which are incorporated herein by reference thereto.

The application also claims the benefit of U.S. Provisional application Ser. No. 60/607,988, filed Sep. 8, 2004, the contents of which are incorporated herein by reference thereto.

This application is also related to the following United States Patent Applications filed contemporaneously herewith: CHILD SEAT AND MONITORING SYSTEM, U.S. application Ser. No. 11/146,927, filed Jun. 6, 2005; CHILD SEAT AND MONITORING SYSTEM, U.S. application Ser. No. 11/146,928, filed Jun. 6, 2005; CHILD RESTRAINT SYSTEM COMPRISING CONTROL UNIT FOR EVALUATING HARNESS ADJUSTMENT; U.S. application Ser. No. 11/147,148, filed Jun. 6, 2005; CHILD RESTRAINT SYSTEM AND METHOD FOR MONITORING INSTALLATION OF THE CHILD RESTRAINT SYSTEM, U.S. application Ser. No. 11/146,926, filed Jun. 6, 2005; CHILD RESTRAINT SYSTEM COMPRISING WEIGHT SENSOR, U.S. application Ser. No. 11/146,921, filed Jun. 6, 2005; CHILD RESTRAINT SYSTEM COMPRISING CONTROL UNIT FOR EVALUATING HARNESS ADJUSTMENT, U.S. application Ser. No. 11/147,149, filed Jun. 6, 2005. The contents of which are each incorporated herein by reference thereto.

TECHNICAL FIELD

This application relates to a child seat monitoring system and method for determining a type of child seat.

BACKGROUND

Child restraint systems have been utilized to hold infants or children therein within vehicles. One type of child restraint system includes a child seat and a base portion for holding the seat, that are rearward-facing with respect to a vehicle seat. A second type of child restraint system utilizes a rearward-facing child seat without the base portion. A third type of child restraint system is a booster child seat that is frontward-facing with respect to the vehicle seat.

Currently, automotive control systems are unable to determine whether a child seat comprises a frontward-facing child seat or a rearward-facing child seat. Accordingly, these systems are unable to control operation of seat bag modules based on whether the child seat comprises a frontward-facing child seat or a rearward facing child-seat.

Accordingly, the inventors herein have recognized a need for a child seat monitoring system that can determine whether a child seat comprises a front-facing child seat or a rearward-facing child seat.

SUMMARY

A child seat monitoring system for a child seat in accordance with exemplary embodiment is provided. The child seat has a first region and an opposite second region. The child seat has first and second patterns disposed on the first and second regions, respectively, both indicating whether the child seat is a forward-facing child seat or a rearward-facing child seat relative to a vehicle seat. The system includes a first detection apparatus configured to detect either the first pattern on the first region of the child seat or the second pattern on the second region of the child seat. The system further includes a controller operably communicating with the first detection apparatus. The controller is configured to generate a first signal when the child seat is a forward-facing child seat.

A method for determining a type of child seat in accordance with another exemplary embodiment is provided. The child seat has a first region and an opposite second region. The child seat has first and second patterns disposed on the first and second regions, respectively, both indicating whether the child seat is a forward-facing child seat or a rearward-facing child seat relative to a vehicle seat. The method includes detecting at least one of the first pattern on the first region of the child seat and the second pattern on the second region of the child seat. The method further includes determining whether the child seat is a forward-facing child seat based on at least one of the first and second patterns, utilizing a controller.

A child seat monitoring system for a child seat in accordance with another exemplary embodiment is provided. The child seat has a first region and an opposite second region. The child seat has a first pattern disposed on the first region indicating that the child seat is not positioned in a desired orientation with respect to a vehicle seat. The system includes a first detection apparatus disposed at a first location configured to detect the first pattern on the first region of the child seat. The system further includes a controller operably communicating with the first detection apparatus. The controller is configured to induce a first device to indicate that the child seat is not positioned in the desired orientation with respect to the vehicle seat in response to the detection of the first pattern by the first detection apparatus.

A child seat monitoring system for a child seat in accordance with another exemplary embodiment is provided. The child seat has first and second patterns disposed on the child seat. The first pattern is substantially covered when a child occupant is greater than a first predetermined size. The second pattern is substantially covered when the child occupant is greater than a second predetermined size. The first predetermined size is greater than the second predetermined size. The child seat monitoring system includes a first detection apparatus configured to detect the first and second patterns on the child seat. The child seat monitoring system further includes a controller operably communicating with the first detection apparatus. The controller is configured to induce a first device to indicate that the child occupant is larger than the first predetermined size when the child occupant substantially covers the first pattern and prevents detection of the first pattern by the first detection apparatus.

DESCRIPTION OF EXEMPLARY EMBODIMENTS

Figure 1:
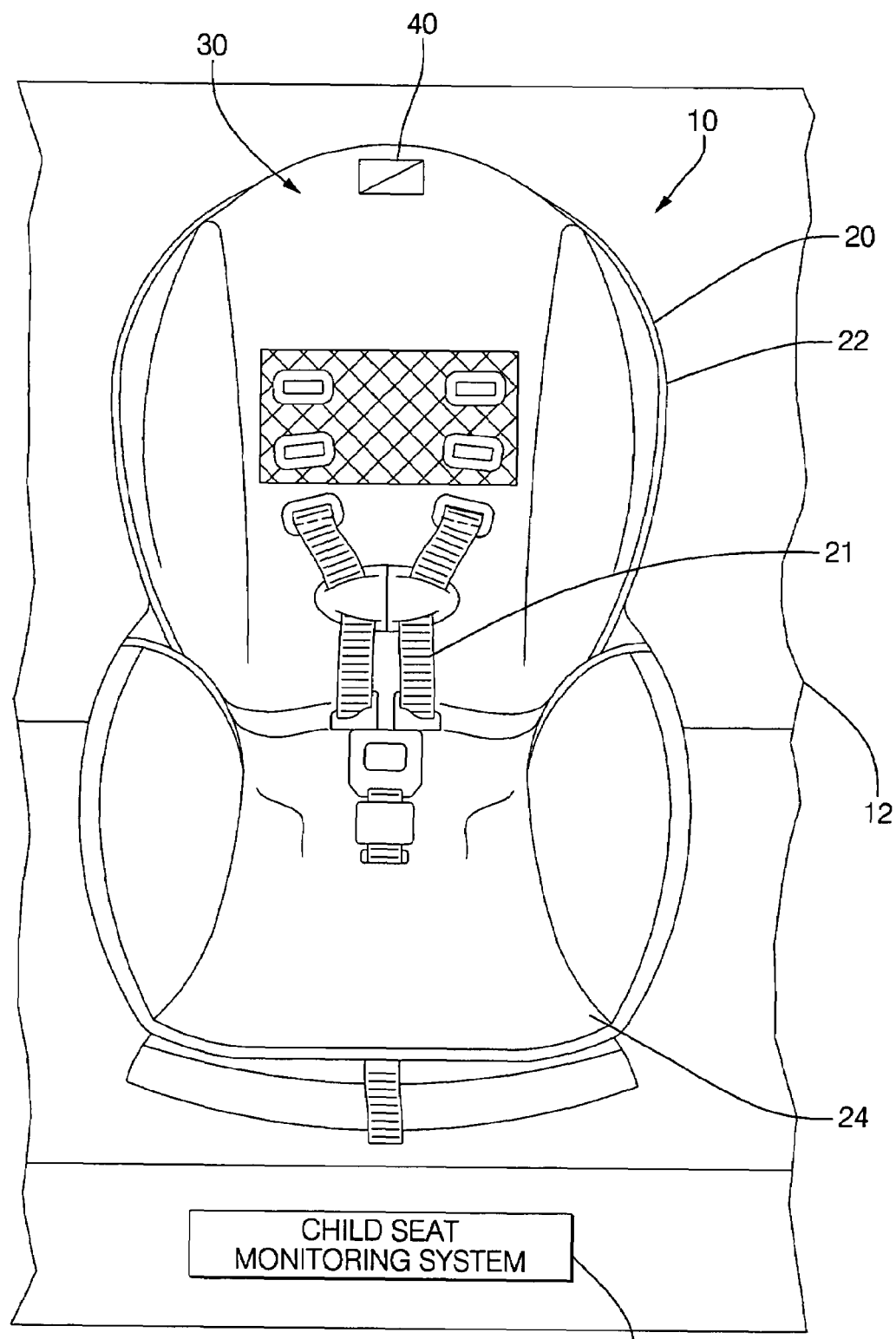
FIG. 1 is a front view of a frontward-facing child restraint system disposed on a vehicle seat and a child seat monitoring system in accordance with an exemplary embodiment.

Referring to FIG. 1, a child restraint system 10 that can be secured to a vehicle seat 12 is provided. Further, a child seat monitoring system 14 for determining a type of child restraint system or child seat is provided. In particular, the child restraint system 10 is secured to the vehicle seat 12 utilizing the vehicle seat belt webbing (not shown). The child restraint system 10 includes a child seat 20 and a chest harness webbing 21 for securing a child occupant in the child seat 20.

Figure 2:
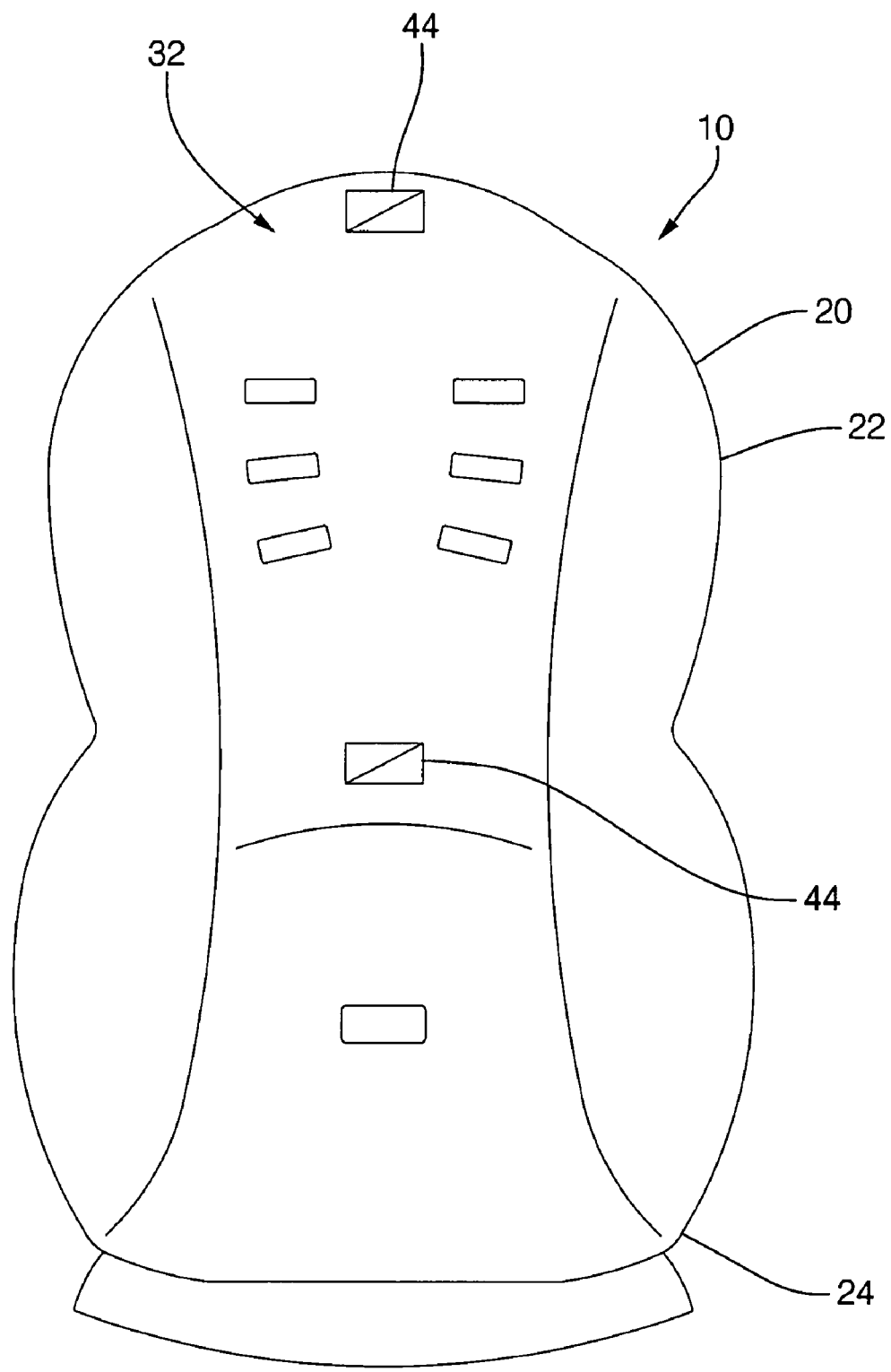
FIG. 2 is a rear view of the frontward-facing child restraint system of FIG. 1.

Referring to FIGS. 1 and 2, the child seat 20 comprises a frontward-facing child seat that is configured to accommodate a child occupant therein. The child seat 20 includes a back portion 22 and a seat portion 24, and patterns 40, 42, 44. The back portion 22 supports a torso of the child occupant and the seat portion 24 supports the buttocks and legs of the child occupant.

The child seat 20 further includes a region 30 viewable by an observer disposed at a first end of the child seat 20 facing a child occupant in the child seat 20. Further, the child seat 20 includes a region 32 viewable by an observer disposed at a second end of the child seat 20 opposite the first end. A desired orientation or placement for the child seat 20 on the vehicle seat 12 results in the region 30 of the child seat 20 being viewable from an observer disposed in a front portion of a vehicle (not shown) along a long axis of the vehicle.

The pattern 40 is disposed on the region 30 of the child seat 20. The pattern 40 is utilized to indicate that the child seat 20 is a frontward-facing child seat. The pattern 42 is disposed on the child seat 20 in the region 30 where a child occupant would ordinarily be seated. The pattern 44 is disposed on the region 32 of the child seat 20. The pattern 44 is also utilized to indicate that the child seat 20 is a frontward facing child seat. It should be noted any type of pattern could be utilized for the patterns to indicate that a child seat is a frontward-facing child seat or a rearward-facing child seat. For example, in an alternate embodiment, the patterns could comprise bar code patterns.

Figure 3:
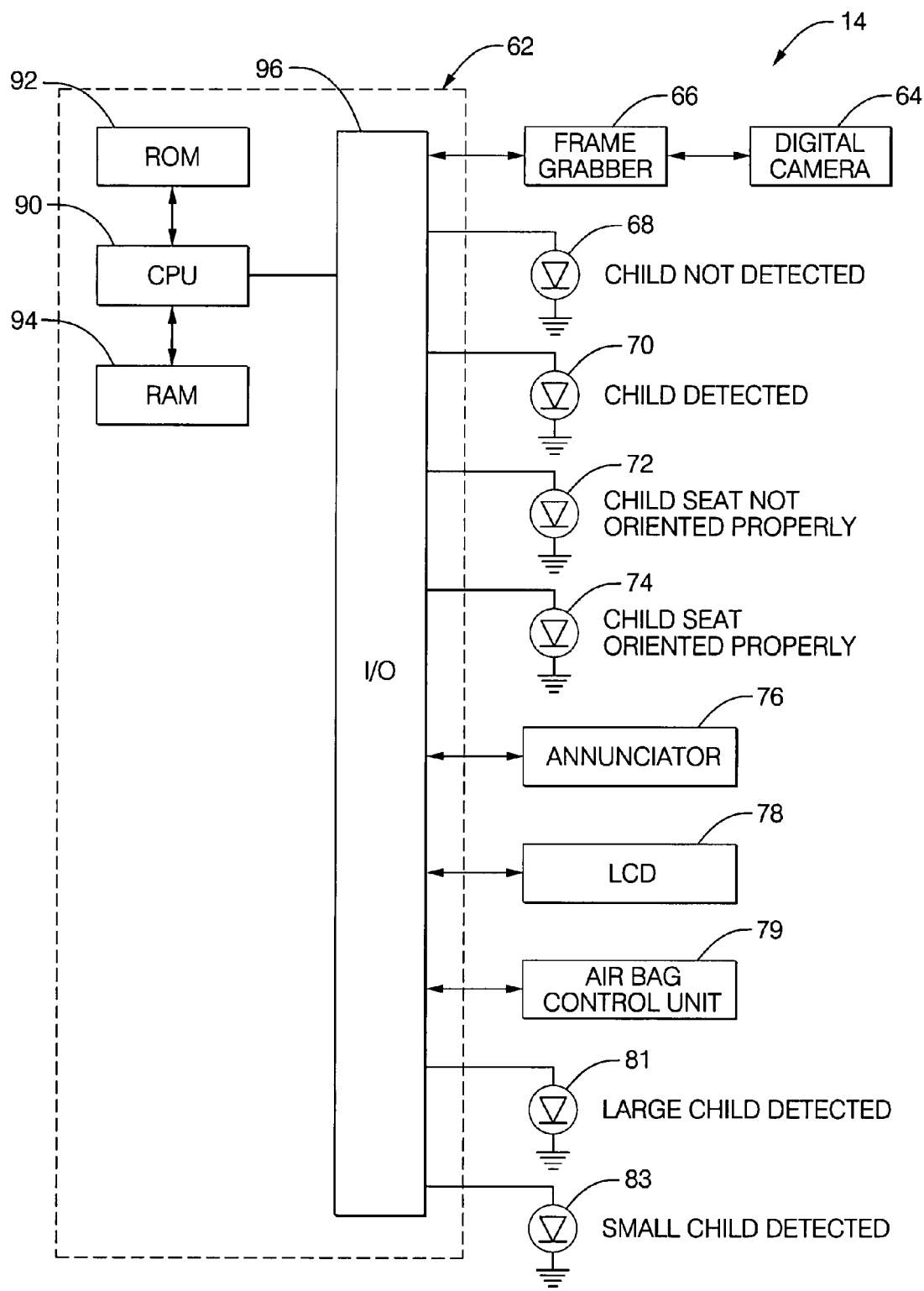
FIG. 3 is an electrical schematic of the child seat monitoring system of FIG. 1.

Referring to FIG. 3, the child seat monitoring system 14 is provided to determine a type of child seat being utilized. The child seat monitoring system 14 includes a controller 62, an electronic digital camera 64, a frame grabber 66, light emitting diodes (LEDs) 68, 70, 72, 74, 81, 83, an annunciator 76, and a liquid crystal display (LCD) 78.

The digital camera 64 is provided to generate digital images of the child restraint system 10. The digital camera 64 is disposed frontwardly of the child restraint system 10 in a vehicle (not shown). In particular, the digital camera 64 can iteratively generate a plurality of digital images of the child restraint system 10. The digital camera 64 is electrically coupled to the frame grabber 66.

The frame grabber 66 is provided to retrieve digital images from the digital camera 64 and to transfer the digital images through the I/O interface 96 to the CPU 90 of the controller 62.

The controller 62 is provided to receive digital images from the digital camera 64 and to compare portions of the digital images to predetermined digital images stored in ROM 92. In particular, the controller 62 is configured to execute image processing software thereon which compares portions of digital images to one another and to calculate a correlation value indicating how closely the portions of the digital images match one another, as known by those skilled in the art. The controller 62 is further provided to determine the type of child restraint system or child seat by utilizing digital images from the digital camera 64 and to control operation of the air bag control unit 79, the LEDs 68, 70, the annunciator 76, and the LCD 78, as will be described in greater detail below. The controller 62 includes a central processing unit (CPU) 90, a read-only memory (ROM) 92, a volatile memory such as a random access memory (RAM) 94 and an input/output (I/O) interface 96. The CPU 90 operably communicates with the ROM 92, the RAM 94, and the I/O interface 96. The computer readable media including ROM 92 and RAM 94 may be implemented using any of a number of known memory devices such as PROMs, EPROMs, EEPROMS, flash memory or any other electric, magnetic, optical or combination memory device capable of storing data, some of which represent executable instructions used by the CPU 90.

In an alternate embodiment, the digital camera 64 is operably coupled to one or more radio frequency (RF) transmitters that transmit RF signals having video image data, and the child seat monitoring system 14 includes an RF receiver operably coupled to the controller 62 configured to receive the RF signals, to allow wireless communication therebetween.

The LED 68 is provided to emit light having a first color to indicate when a child occupant is not disposed in the child seat 20. The LED 68 is electrically coupled to the I/O interface 96.

The LED 70 is provided to emit light having a second color to indicate when a child occupant is disposed in the child seat 20. The LED 70 is electrically coupled to the I/O interface 96.

The LED 72 is provided to emit light having a first color to indicate that the child seat 20 is not orientated in a desired orientation. The LED 72 is electrically coupled to the I/O interface 96.

The LED 74 is provided to emit light having a second color to indicate that the child seat 20 is orientated in a desired orientation. The LED 74 is electrically coupled to the I/O interface 96.

The LED 81 is provided to emit light having a first color to indicate that the child occupant in the child seat 20 is larger than a first predetermined size. The LED 81 is electrically coupled to the I/O interface 96.

The LED 83 is provided to emit light having a second color to indicate that the child occupant in the child seat 20 is smaller than a second predetermined size wherein the second predetermined size is smaller than the first predetermined size. The LED 83 is electrically coupled to the I/O interface 96. The electrical annunciator 76 is provided to emit a first audible sound when a child occupant is not disposed in the child seat 20, in response to a control signal from the controller 62. The annunciator 76 is further provided to emit a second audible sound when the child occupant is disposed in the child seat 20, in response to a control signal from the controller 62. The annunciator 76 is electrically coupled to the I/O interface 96.

The LCD 78 is provided to display a first message when a child occupant is not disposed in the child seat 20, in response to a control signal from the controller 62. The LCD 78 is further provided to display a second message when a child occupant is disposed in the child seat 20, in response to a control signal from the controller 62. The LCD 78 is electrically coupled to the I/O interface 96.

The air bag control unit 79 is provided to control operation of an airbag (not shown). In particular, when the air bag control unit 79 receives a first signal from the controller 62 via the I/O interface 96, the air bag control unit 79 suppresses or disables operation of the air bag. Further, when the air bag control unit 79 receives a third signal from the controller 62 via the I/O interface 96, the air bag control unit 79 does not suppress operation of the air bag. Further, when the air bag control unit 79 receives a second signal from the controller 62 via the I/O interface 96, the air bag control unit 79 is configured to allow deployment of a de-powered air bag. A de-powered air bag is one that inflates at a slower rate as compared to a full-powered air bag or to a lesser volumetric extent as compared to a full-powered air bag, or a shorter distance toward a vehicle occupant as compared to a full-powered air bag.

Figure 4:
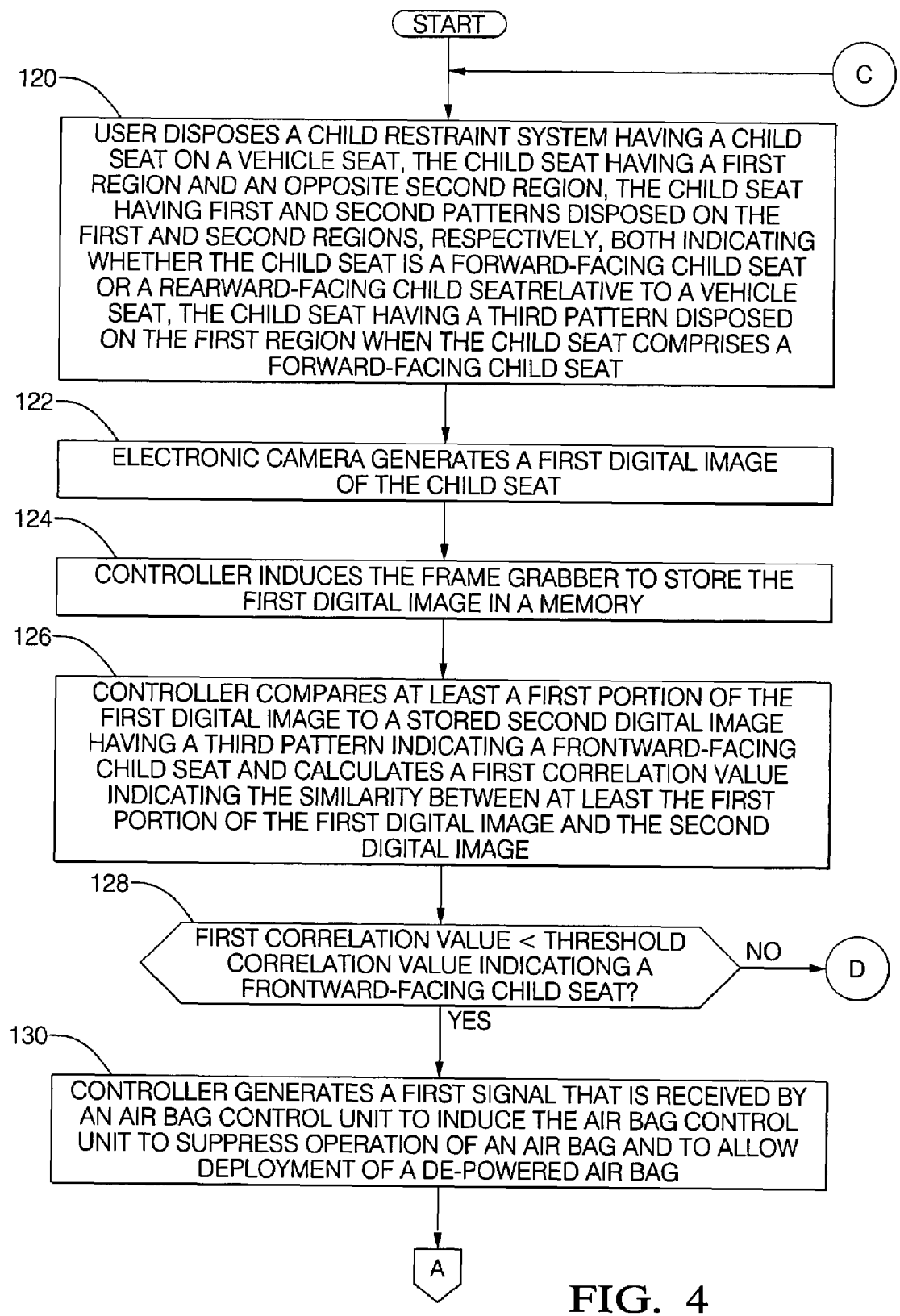
FIGS. 4-6 are flowcharts of a method for determining a type of child seat.
Figure 5:
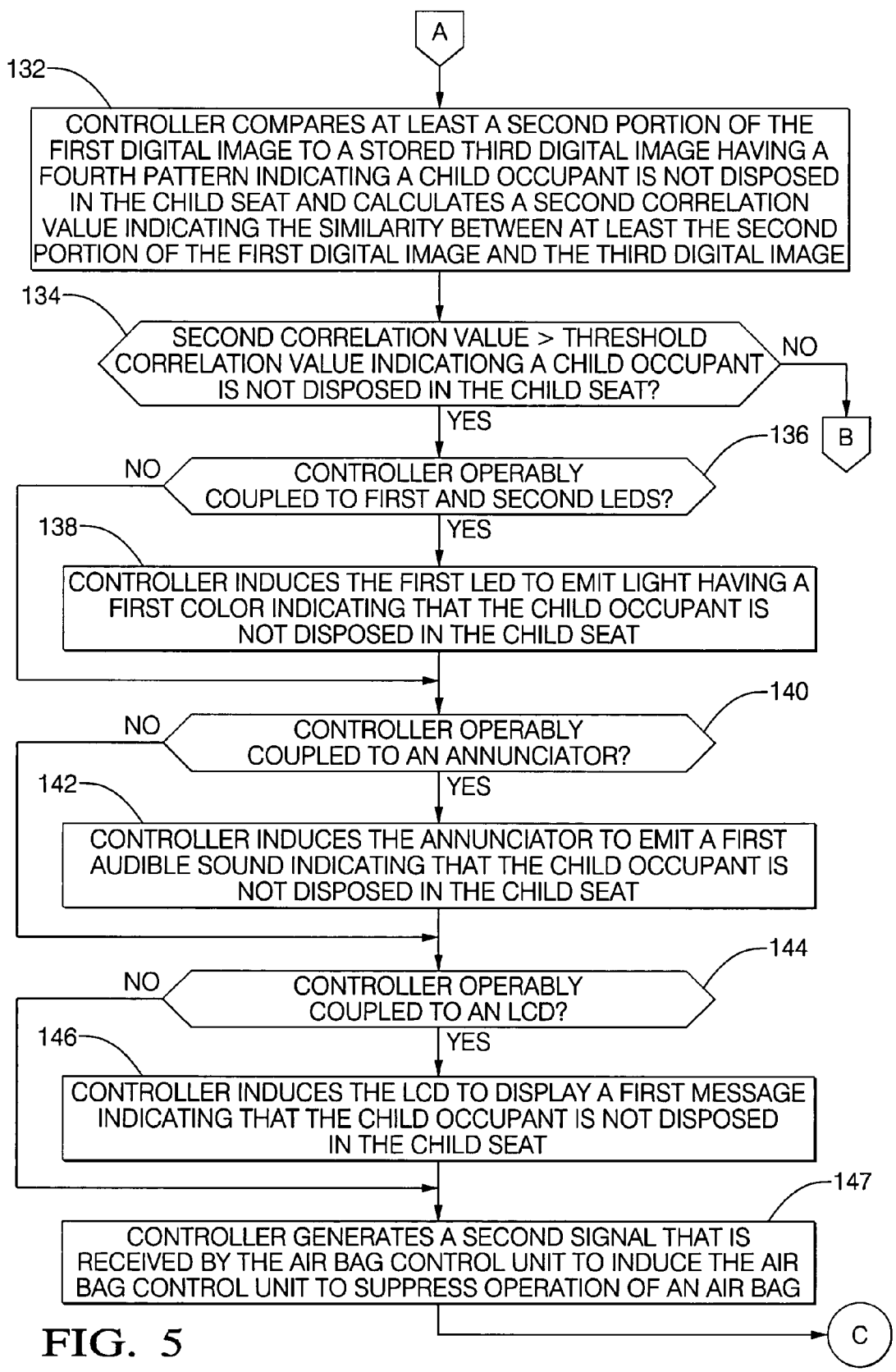
Figure 6:
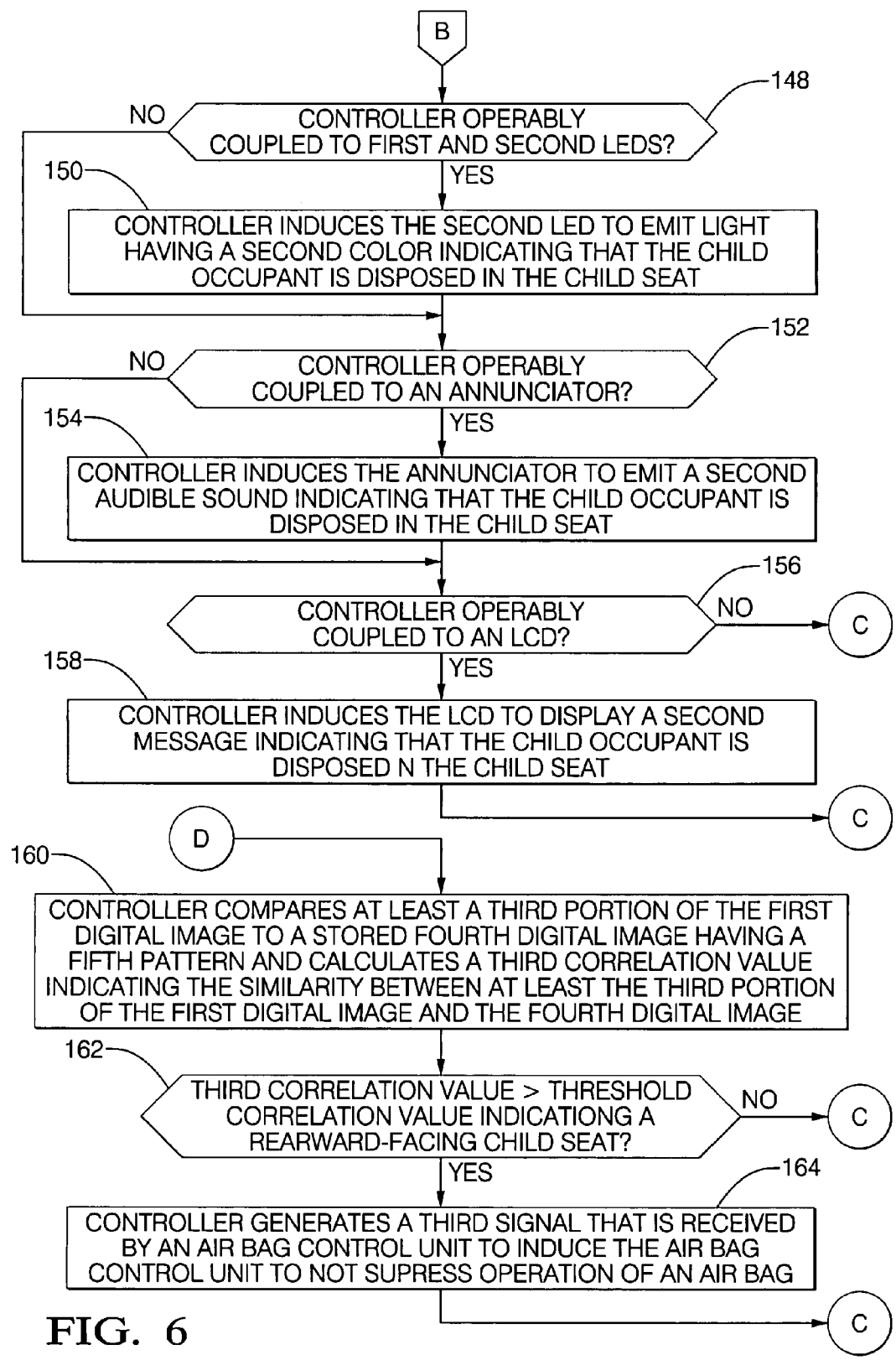

Referring to FIGS. 4-6, a method for determining a type of child restraint system will now be described. The method is implemented utilizing software algorithms executed by the controller 62 of the child seat monitoring system 14.

At step 120, a user disposes a child restraint system 10 having a child seat 20 on the vehicle seat 12. The child seat 20 has a region 30 and opposite region 32. The child seat has patterns 40, 44 disposed on the regions 30, 32, respectively, both indicating whether the child seat 20 is a forward-facing child seat or a rearward-facing child seat relative to a vehicle seat 12. The child seat 20 has a pattern 42 disposed on the region 30 when the child seat comprises a forward-facing child seat.

Next at step 122, the electronic digital camera 64 generates a first digital image of the child seat 20.

Next at step 124, the controller 62 induces the frame grabber 66 to store the first digital image in a memory.

Next at step 126, the controller 62 compares at least a first portion of the first digital image to a stored second digital image having a pattern 40 indicating a frontward-facing child seat and calculates a first correlation value indicating the similarity between at least the first portion of the first digital image and the second digital image.

Next at step 128, the controller 62 makes a determination as to whether the first correlation value is greater than the threshold correlation value indicating a frontward-facing child seat. If the value of step 128 equals "yes", the method advances to step 130. Otherwise, the method advances to step 160.

At step 130, the controller 62 generates a first signal that is received by an air bag control unit 79 to induce the air bag control unit 79 to suppress or disable operation of an air bag (not shown) or to allow deployment of a de-powered air bag.

Next at step 132, the controller 62 compares at least a second portion of the first digital image to a stored third digital image having a pattern 42 indicating that a child occupant is not disposed in the child seat 20 and calculates a second correlation value indicating the similarity between at least the second portion of the first digital image and the third digital image.

Next at step 134, the controller 62 makes a determination as to whether the second correlation value is greater than the threshold correlation value indicating a child occupant is not disposed in the child seat 20. If the value of step 134 equals "yes", the method advances to step 136. Otherwise, the method advances to step 148.

At step 136, the controller 62 makes a determination as to whether the controller 62 is operably coupled to LEDs 68, 70. If the value of step 136 equals "yes", the method advances to step 138. Otherwise, the method advances to step 140.

At step 138, the controller 62 induces the LED 68 to emit light having a first color indicating that the child occupant is not disposed in the child seat 20. After step 138, the method advances to step 140.

At step 140, the controller 62 makes a determination as to whether the controller 62 is operably coupled to the annunciator 76. If the value of step 140 equals "yes", the method advances to step 142. Otherwise, the method advances to step 144.

At step 142, the controller 62 induces the annunciator 76 to emit a first audible sound indicating that the child occupant is not disposed in the child seat 20. After step 142, the method advances to step 144.

At step 144, the controller 62 makes a determination as to whether the controller 62 is operably coupled to the LCD 78. If the value of step 144 equals "yes", the method advances to step 146. Otherwise, the method advances to step 147.

At step 146, the controller 62 induces the LCD 78 to display a first message indicating that the child occupant is not disposed in the child seat 20. After step 146, the method to step 147.

At step 147, the controller 62 generates a second signal that is received by the air bag control unit 79 to induce the air bag control unit 79 to suppress operation of an air bag. After step 147, the method returns to step 120.

Referring again to step 134, when the value of the step 134 equals "no", the method advances to step 148. At step 148, the controller 62 makes a determination as to whether the controller 62 is operably coupled to the LEDs 68, 70. If the value of step 148 equals "yes", the method advances to step 150. Otherwise, the method advances to step 152.

At step 150, the controller 62 induces the LED 70 to emit light having a second color indicating that the child occupant is disposed in the child seat 20. After step 150, the method advances to step 152.

At step 152, the controller 62 makes a determination as whether the controller 62 is operably coupled to the annunciator 76. If the value of step 152 equals "yes", the method advances to step 154. Otherwise, the method advances to step 156.

At step 154, the controller 62 induces the annunciator 76 to emit a second audible sound indicating that the child occupant is disposed in the child seat 20. After step 154, the method advances to step 156.

At step 156, the controller 62 makes a determination as whether the controller 62 is operably coupled to the LCD 78. If the value of step 156 equals "yes", the method advances to step 158. Otherwise, the method returns to step 120.

At step 158, the controller 62 induces LCD 78 to display a second message indicating that the child occupant is disposed in the child seat 20. After step 158, the method returns to step 120.

Referring again to step 128, when the value of step 128 equals "no", the method advances to step 160. At step 160, the controller 62 compares at least a third portion of the first digital image to a stored fourth digital image having a pattern 44 and calculates a third correlation value indicating the similarity between at least the third portion of the first digital image and the fourth digital image.

At step 162, the controller 62 makes a determination as to whether the third correlation value is greater than the threshold correlation value indicating a rearward-facing child seat. If the value of step 162 equals "yes", the method advances to step 164. Otherwise, the method returns to step 120.

At step 164, the controller 62 generates a third signal that is received by an air bag control unit 79 to induce the air bag control unit 79 to not suppress operation of an air bag. After step 164, the method advances to step 120.

Figure 7:
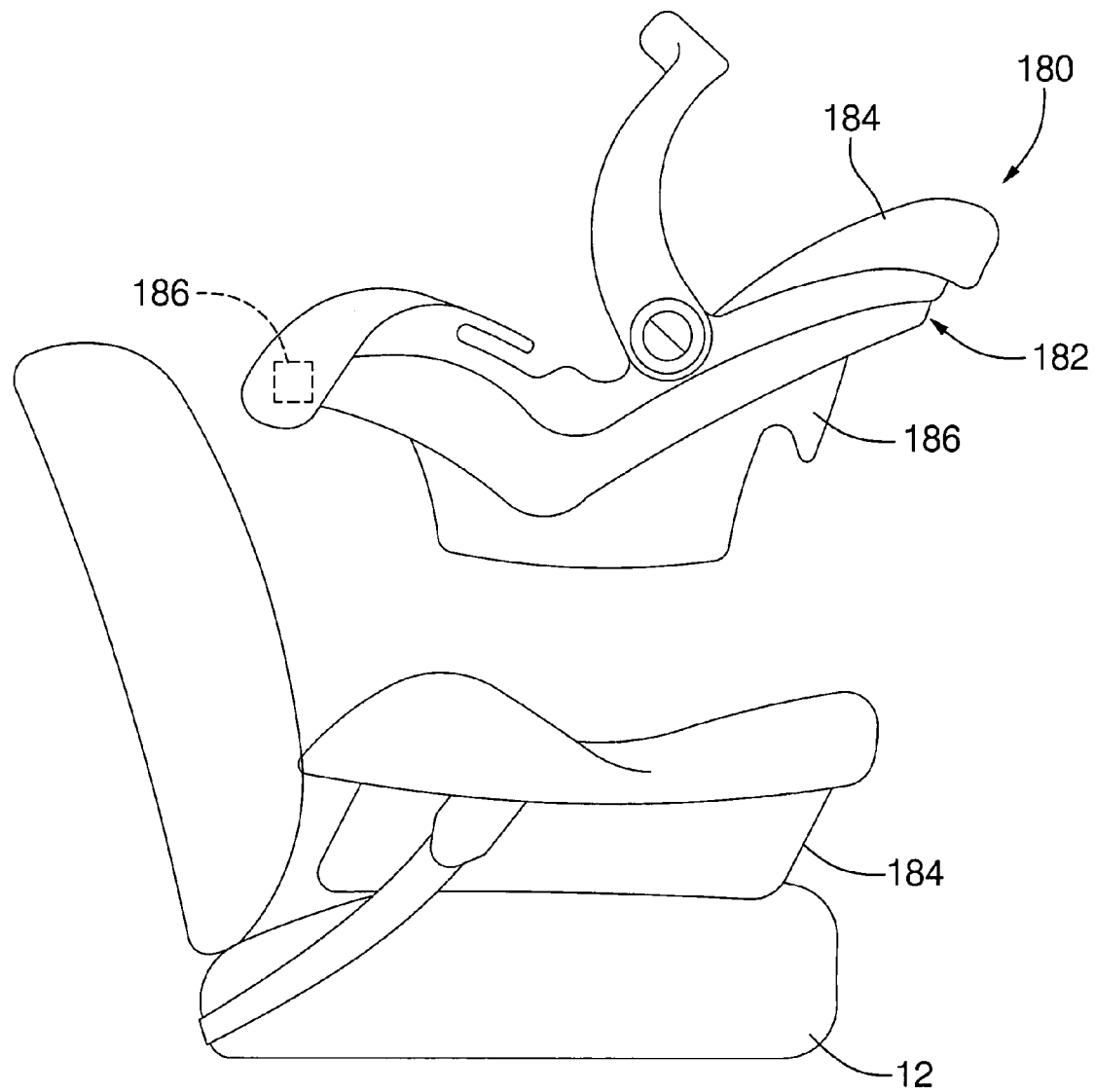
FIG. 7 is a diagram of a rearward-facing child seat.

Referring to FIG. 7, a rearward-facing child restraint system 180 that can be disposed on the vehicle seat 12 is illustrated. The above-described methodology for determining type of child seat can also be similarly utilized with the child restraint system 180.

The child restraint system 180 includes a removable child seat/carrier 182 and base portion 184 for receiving the child seat 182 therein. Patterns indicating a rearward-facing child seat are disposed on the regions 184, 186 of the child seat 182. Further, the child seat monitoring system 14 can detect the patterns in at least one of the regions 184, 186, and transmit signals to the air bag control module 79, the LEDs 68, 70, the annunciator 76 and the LCD 78, as described above.

Figure 8:
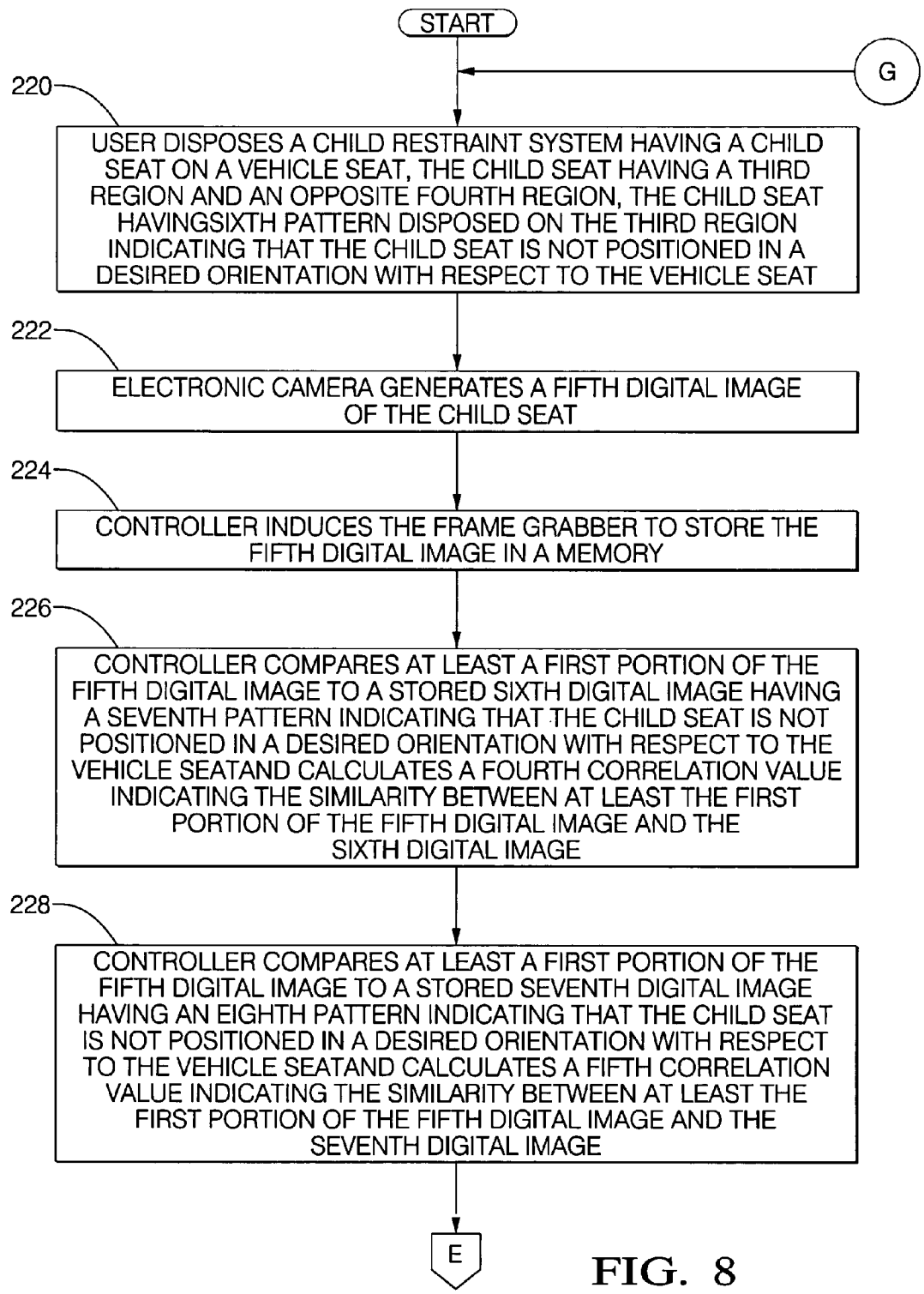
FIGS. 8-10 are flowcharts of a method for determining whether a child seat is orientated in a desired orientation with respect to a vehicle seat.
Figure 9:
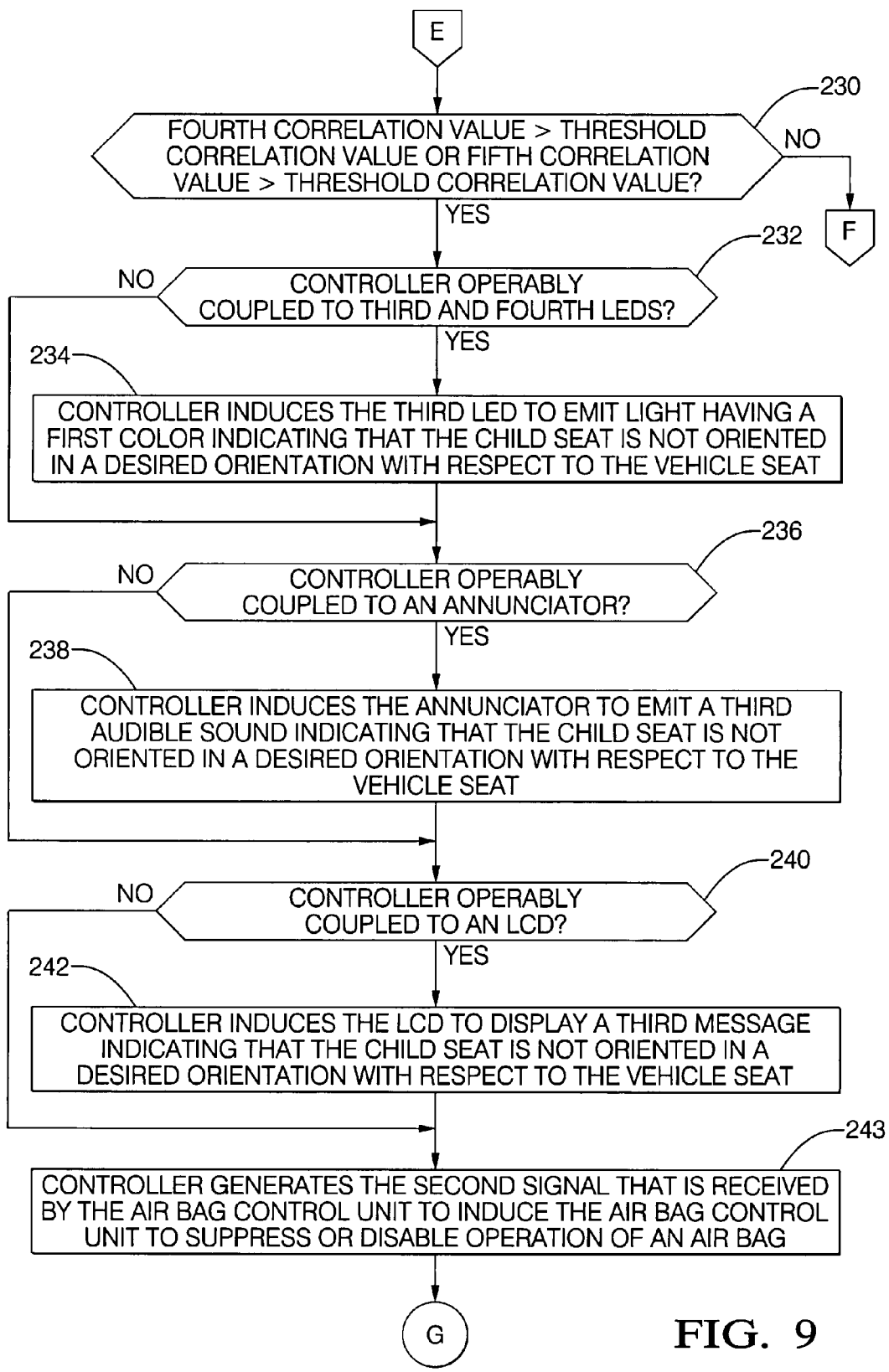
Figure 10:
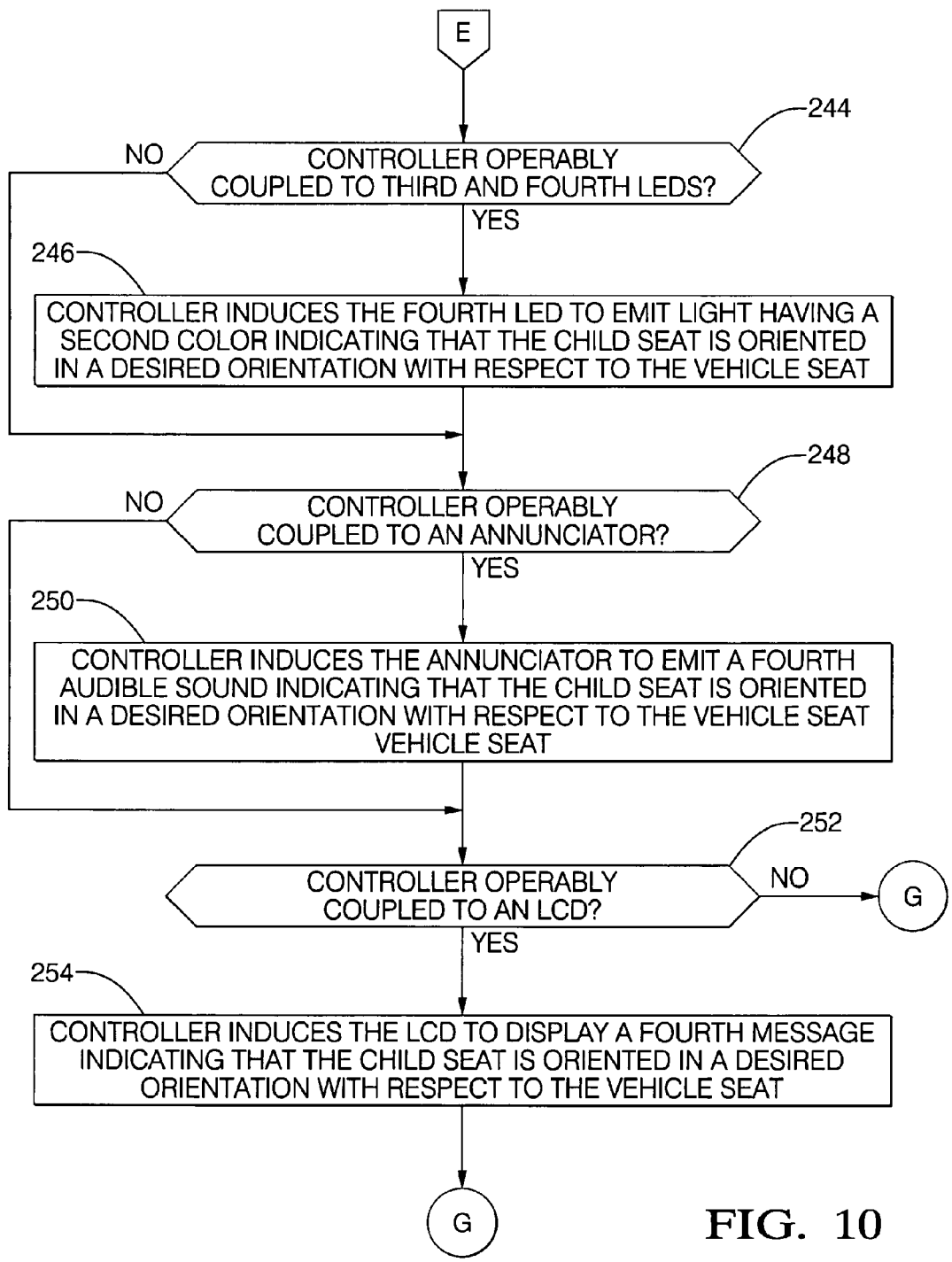

Referring to FIGS. 8-10, a method for determining whether a child seat is positioned in a desired orientation with respect to the vehicle seat 12 will now be explained. The method is implemented utilizing software algorithms executed by the controller 62 of the child seat monitoring system 14. Referring to FIG. 2, it should be noted that the following method will be explained utilizing a frontward-facing seat 20 having a pattern 47 disposed on a region 32 indicating placement of the child seat 20 in an undesired orientation (e.g., rearward-facing orientation) with respect to the vehicle seat 12. Referring to FIG. 7, the method can also be utilized with a rearward-facing child seat 180 having a pattern 186 disposed on a front portion of the child seat 180 indicating placement of the child seat 180 in an undesired orientation (e.g., frontward-facing orientation) with respect to the vehicle seat 12.

Next at step 220, a user disposes the child restraint system 10 having the child seat 20 on the vehicle seat 12. The child seat 20 has the region 30 and an opposite region 32. The child seat 20 has a pattern 47 disposed on the region 32 indicating that the child seat 20 is not positioned in a desired orientation with respect to the vehicle seat 12.

Next at step 222, the electronic camera 64 generates a fifth digital image of the child seat 20.

Next at step 224, the controller 62 induces the frame grabber 66 to store the fifth digital image in a memory 94.

Next at step 226, the controller 62 compares at least a first portion of the fifth digital image to a stored sixth digital image. The sixth digital image having a pattern 47 indicating that the child seat 20 is not positioned in a desired orientation with respect to the vehicle seat 12. Further, the controller 62 calculates a fourth correlation value indicating the similarity between at least the first portion of the fifth digital image and the sixth digital image.

Next at step 228, the controller 62 compares at least the first portion of the fifth digital image to a stored seventh digital image. The seventh digital image having a pattern 186 indicating that a child seat 180 is not positioned in a desired orientation with respect to the vehicle seat 12. Further, the controller 62 calculates a fifth correlation value indicating the similarity between at least the first portion of the fifth digital image and the seventh digital image.

At step 230, the controller 62 makes a determination as to whether either (i) the fourth correlation value is greater than a threshold correlation value, or (ii) the fifth correlation value is greater than a threshold correlation value. If the value of step 230 equals "yes", the method advances to step 232. Otherwise, the method advances to step 244.

At step 232, the controller 62 makes a determination as to whether the controller 62 is operably coupled to the LEDs 72, 74. If the value of step 232 equals "yes", the method advances to step 234. Otherwise, the method advances to step 236.

At step 234, the controller 36 induces the LED 72 to emit light having a first color indicating that the child seat 20 is not oriented in a desired orientation with respect to the vehicle seat 12. After step 234, the method advances to step 236.

At step 236, the controller 62 makes a determination as to whether the controller 62 is operably coupled to an enunciator 76. If the value of step 236 equals "yes", the method advances to step 238. Otherwise, the method advances to step 240.

At step 238, the controller 62 induces the annunciator 76 to emit a third audible sound indicating that the child seat 20 is not oriented in a desired orientation with respect to the vehicle seat 12. After step 238, the method advances to step 240.

At step 240, the controller 62 makes a determination as to whether the controller 62 is operably coupled to the LCD 78. If the value of step 240 equals "yes", the method advances to step 242. Otherwise, the method advances to step 243.

At step 242, the controller 62 induces the LCD 78 to display a third message indicating that the child seat 20 is not oriented in a desired orientation with respect to the vehicle seat 12. After step 242, the method advances to step 243.

At step 243, the controller 62 generates the second signal that is received by the air bag control unit 79 to induce the air bag control unit 79 to suppress or disable operation of an air bag. After step 243, the returns to step 220.

Referring again to step 230, when a value of step 230 equals "no", the method advances to step 244. At step 244, the controller 62 makes a determination as to whether the controller 62 is operably coupled to the LEDs 72, 74. If the value of step 244 equals "yes", the method advances to step 246. Otherwise, the method advances to step 248.

At step 246, the controller 62 induces the LED 74 to emit light having a second color indicating that the child seat 20 is oriented in a desired orientation with respect to the vehicle seat 12. After step 246, the method advances to step 248.

At step 248, the controller 62 makes a determination as to whether the controller 62 is operably coupled to the enunciator 76. If the value of step 248 equals "yes", the method advances to step 250. Otherwise, the method advances to step 252.

At step 250, the controller 62 induces the annunciator 76 to emit a fourth audible sound indicating that the child seat 20 is oriented in a desired orientation with respect to the vehicle seat 12. After step 250, the method advances to step 252.

At step 252, the controller 62 makes a determination as to whether the controller 62 is operably coupled to the LCD 78. If the value of step 252 equals "yes", the method advances to step 254. Otherwise, the method returns to step 220.

At step 254, the controller 62 induces the LCD 78 to display a fourth message indicating that the child seat 20 is oriented in a desired orientation with respect to the vehicle seat 12. After step 254, method returns to step 220.

Figure 11:
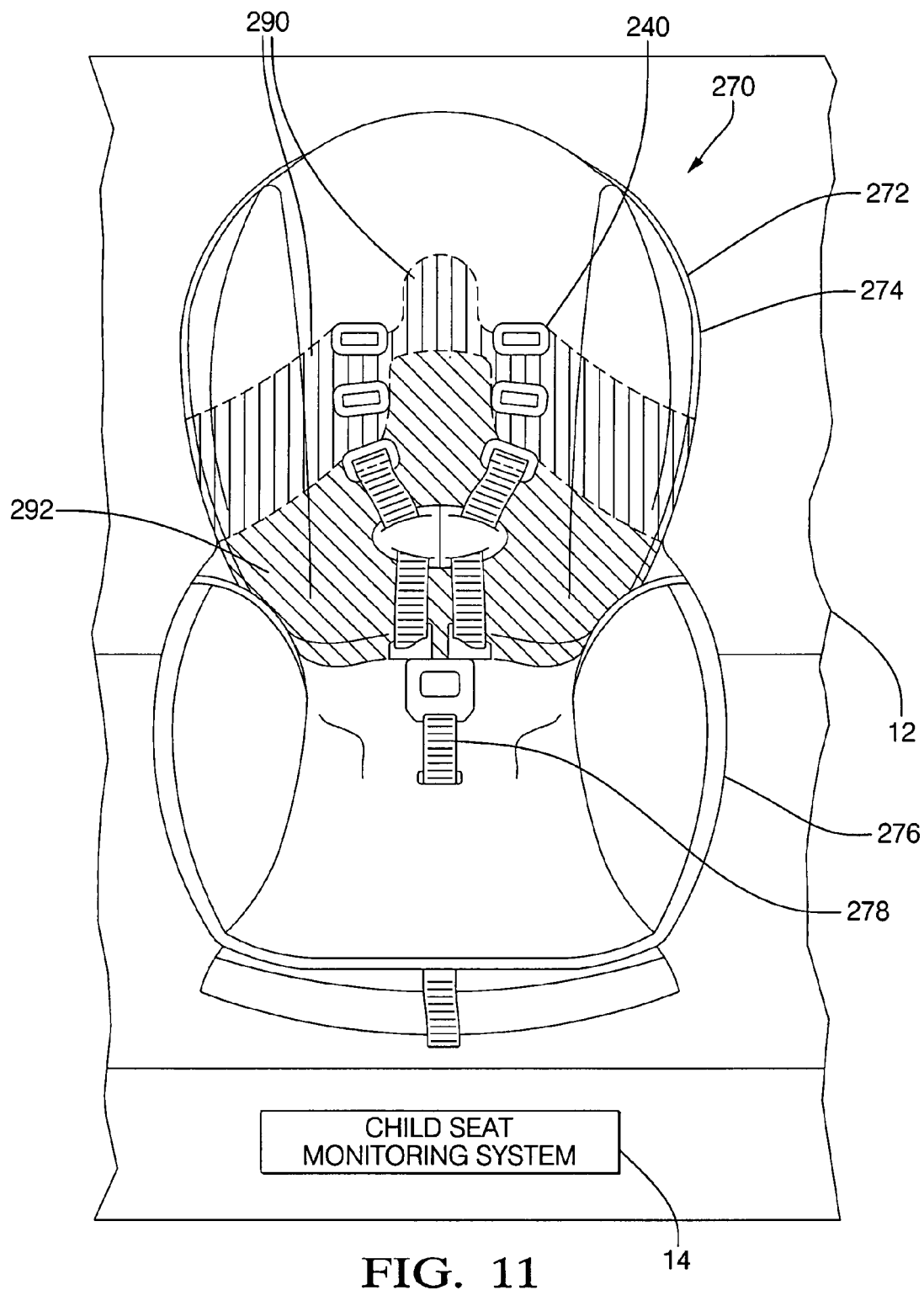
FIG. 11 is a diagram of a frontward-facing child seat having predetermined patterns for determining a size of a child occupant.
Figure 12:
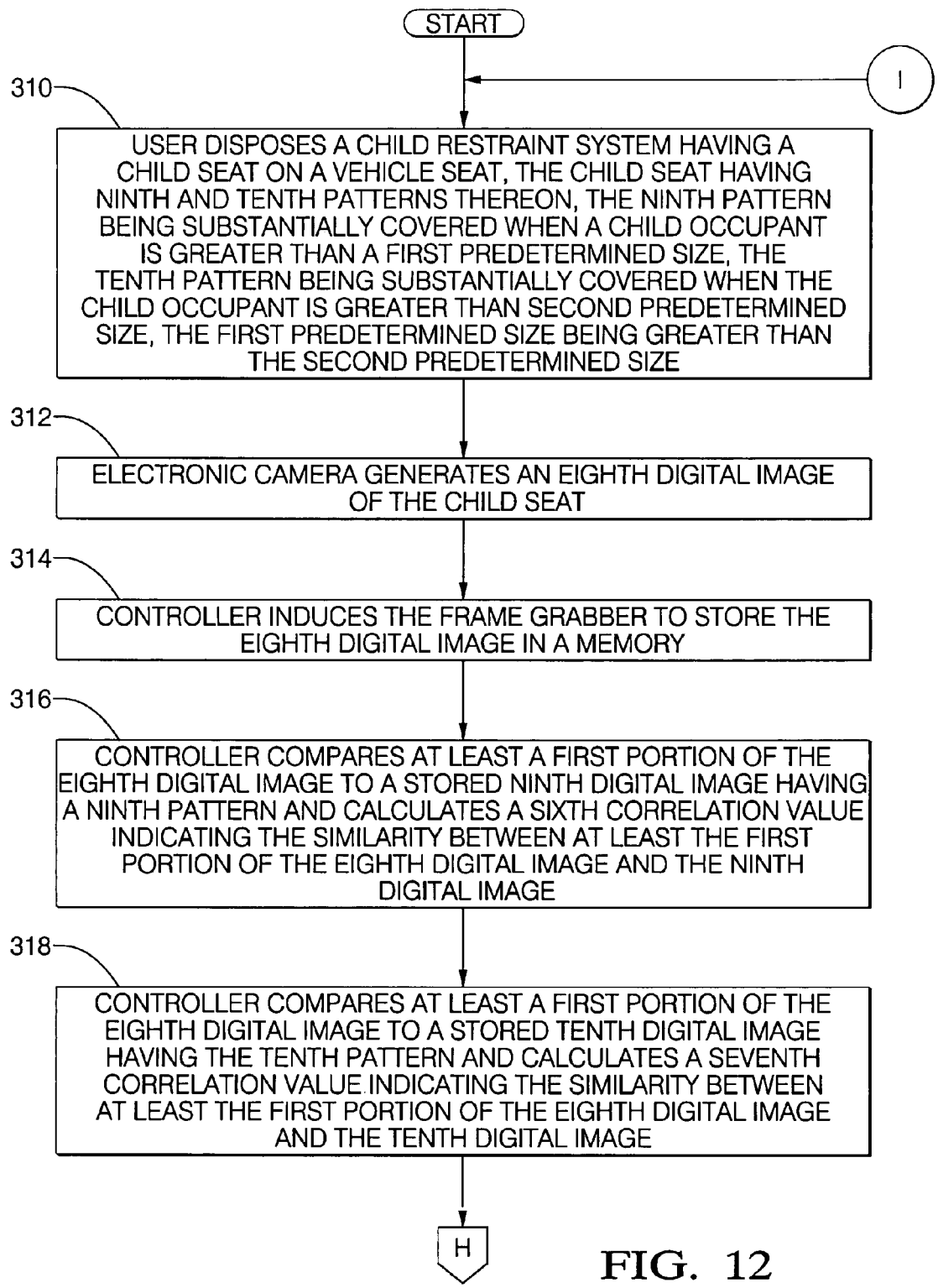
FIGS. 12-15 are flowcharts of a method for determining whether a child occupant in the child seat is larger than a first predetermined size or smaller than a second predetermined size.
Figure 13:
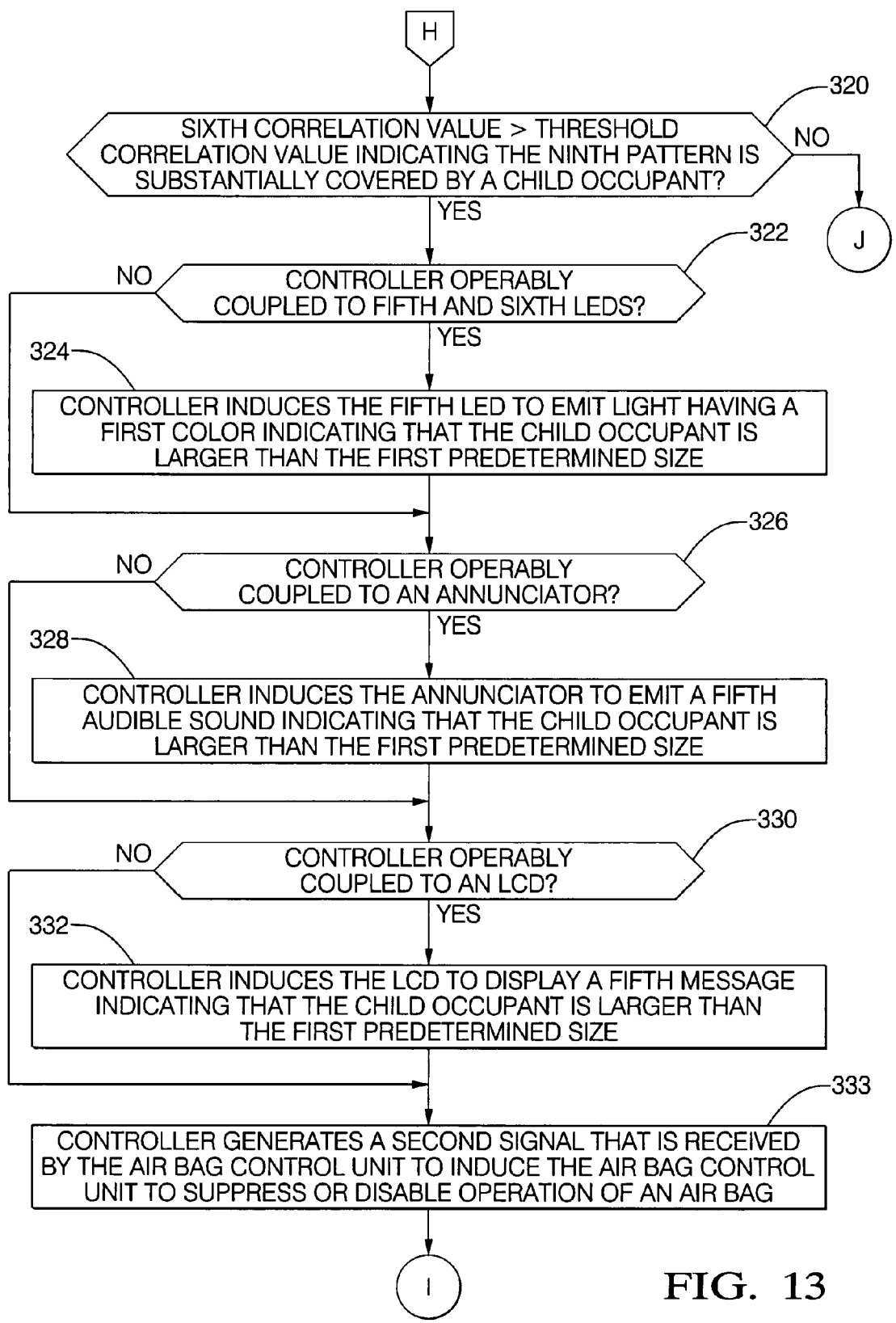
Figure 14:
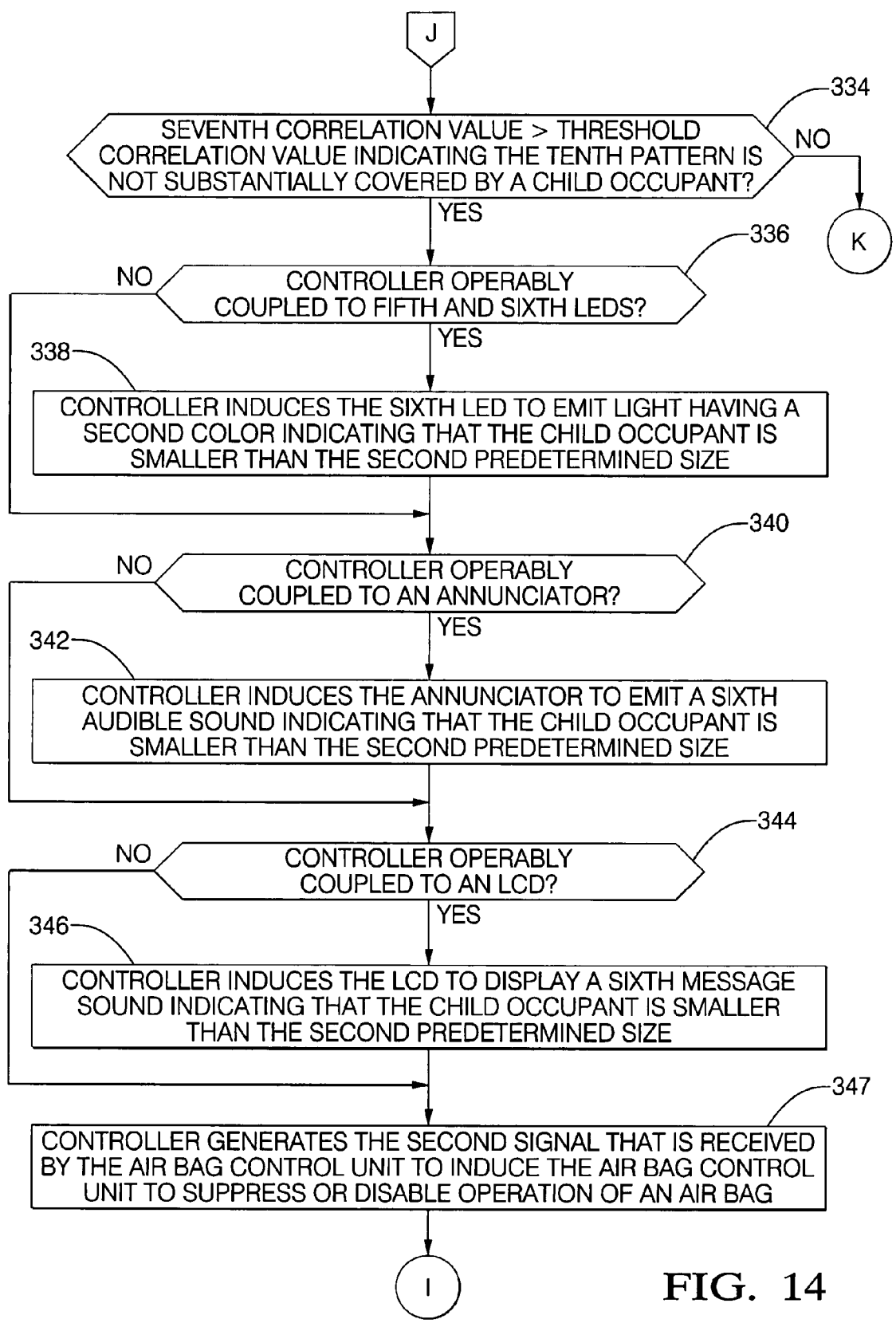
Figure 15:
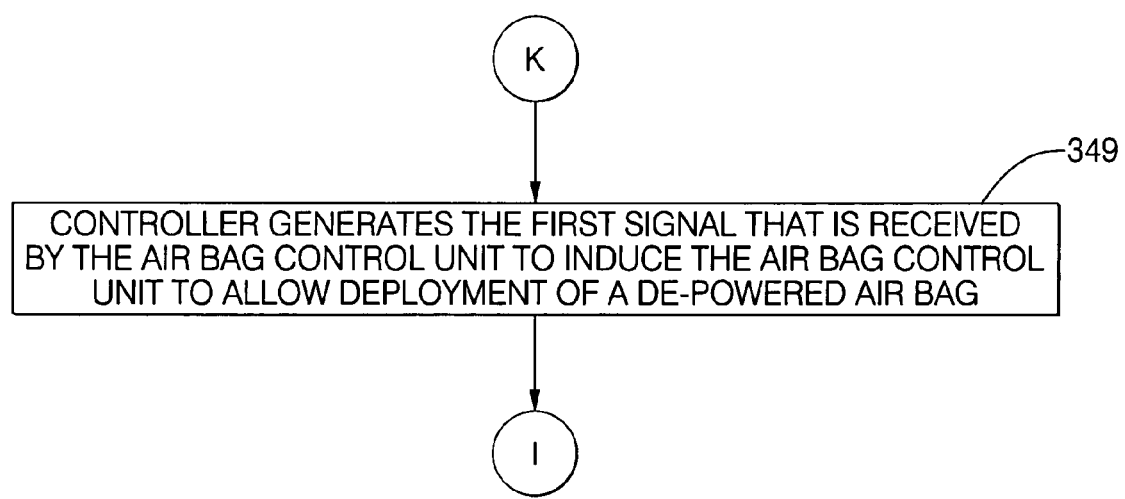

Referring to FIG. 11, a child restraint system 270 comprises a frontward-facing child seat 272 that is configured to accommodate a child occupant therein. The child seat 272 includes a back portion 274, a seat portion 276, and patterns 290, and 292.

The pattern 290 is disposed on the back portion 274 and is sized and shaped to be substantially covered when a child occupant in the child seat 272 is greater that a first predetermined size, wherein the first predetermined size is larger than a desired size of an occupant for the child seat 272.

The pattern 292 is disposed on the back portion 274 and is sized and shaped to be substantially covered when a child occupant in the child seat 272 is greater that a second predetermined size, wherein the second predetermined size is minimum desired size of an occupant for the child seat 272.

Referring to FIGS. 12-15, a method for determining whether a child occupant is larger than a first predetermined size or smaller than a second predetermined size will now be explained. The method is implemented utilizing software algorithms executed by the controller 62 of the child seat monitoring system 14.

At step 310, the user disposes the child restraint system 270 having a child seat 272 on the vehicle seat 12. The child seat 272 has patterns 290, 292 thereon. The pattern 290 is substantially covered when a child occupant is greater than a first predetermined size. The pattern 292 is substantially covered when the child occupant is greater than a second predetermined size. The first predetermined size is greater than the second predetermined size.

Next at step 312, the electronic camera 64 generates an eighth digital image of the child seat 272.

Next at step 314, the controller 62 induces the frame grabber 66 to store the eighth digital image in a memory 94.

Next at step 316, the controller 62 compares at least a first portion of the eighth digital image to a stored ninth digital image having the pattern 290. Further, the controller 62 calculates a sixth correlation value indicating the similarity between at least the first portion of the eighth digital image and the ninth digital image.

Next at step 318, the controller 62 compares at least a first portion of the eighth digital image to a stored tenth digital image having the pattern 292. Further, the controller 62 calculates a seventh correlation value indicating the similarity between at least the first portion of the eighth digital image and the tenth digital image.

Next at step 320, the controller 62 makes a determination as to whether the sixth correlation value is less than a threshold correlation, indicating the pattern 290 is substantially covered by a child occupant. If the value of step 320 equals "yes", the method advances to 322. Otherwise, the method advances to step 334.

At step 322, the controller 62 makes a determination as to whether the controller 62 is operably coupled to the LEDs 81, 83. If the value of step 322 equals "yes", the method advances to step 324. Otherwise, the method advances to step 326.

At step 324, the controller 62 induces the LED 81 to emit light having a first color indicating that the child occupant is larger than the first predetermined size. After step 324, the method advances to step 326.

At step 326, the controller 62 makes a determination as to whether the controller 62 is operably coupled to the enunciator 76. The value of step 326 equals "yes", the method advances to step 328. Otherwise, the method advances to step 330.

At step 328, the controller 62 induces the annunciator 76 to emit a fifth audible sound indicating that the child occupant is larger than the first predetermined size. After step 328, the method advances to step 330.

At step 330, the controller 62 makes a determination as to whether the controller 62 is operably coupled to the LCD 78. If the value of step 330 equals "yes", the method advances to step 332. Otherwise, the method advances to step 333.

At step 332, the controller 62 induces the LCD 78 to display a fifth message indicating that the child occupant is larger than the first predetermined size. After step 332, the method advances to step 333. After step 333, the method returns to step 310.

Referring again to step 320, when a value of step 320 equals "no", the method advances to step 334. At step 334, the controller 62 makes a determination as to whether the seventh correlation value is less than a threshold correlation value indicating the pattern 292 is not substantially covered by the child occupant. If the value of step 334 equals "yes", the method advances to step 336. Otherwise, the method advances to step 349.

At step 336, the controller 62 makes a determination as to whether the controller 62 is operably coupled to the LEDs 81, 83. If the value of step 336 equals "yes", the method advances to step 338. Otherwise, the method advances to step 340.

At step 338, the controller 62 induces the LED 83 to emit light having a second color indicating that the child occupant is smaller than the second predetermined size. After step 338, the method advances to step 340.

At step 340, the controller 62 makes a determination as to whether the controller 62 is operably coupled to the annunciator 76. If the value of step 340 equals "yes", the method advances to step 342. Otherwise, the method advances to step 344.

At step 342, the controller 62 induces the annunciator 76 to emit a sixth audible sound indicating that the child occupant is smaller than the second predetermined size. After step 342, the method advances to step 344.

At step 344, the controller 62 makes a determination as to whether the controller 62 is operably coupled to the LCD 78. If the value of step 344 equals "yes", the method advances to step 346. Otherwise, the method advances to step 347.

At step 346, the controller 62 induces the LCD 78 to display a sixth message sound indicating that the child occupant is smaller than the second predetermined size. After step 346, the method advances to step 347.

At step 347, the controller 62 generates a second signal that is received by the air bag control unit 79 to induce the air bag control unit 79 to suppress or disable operation of an air bag. After step 347, the method returns to step 310.

Referring again to step 334, when a value of step 334 equals "no", the method advances to step 349. At step 349, the controller 62 generates the first signal that is received by the air bag control unit 79 to induce the air bag control unit 79 to allow deployment of a de-powered air bag. After step 349, the method returns to step 310.

The child seat monitoring system and a method for determining a type of child seat provide a substantial advantage over other systems and methods. In particular, the child seat monitoring system provides a technical effect of determining a type of child seat and controlling operation of an air bag based on the type of child seat, the size of the child occupant, and whether the seat is empty.

As described above, the method for determining a type of child seat can be embodied in the form of computer-implemented processes and apparatuses for practicing those processes. In an exemplary embodiment, the method is embodied in computer program code executed by one or more elements. The present method may be embodied in the form of computer program code containing instructions embodied in tangible media, such as floppy diskettes, CD-ROMs, hard drives, flash memory or any other computer-readable storage medium, wherein, when the computer program code is loaded into and executed by a computer, the computer becomes an apparatus for practicing the invention. The present method can also be embodied in the form of computer program code, for example, whether stored in a storage medium, loaded into and/or executed by a computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A child seat monitoring system for a child seat, the child seat having a first region and an opposite second region, the child seat having first and second patterns disposed on the first and second regions, respectively, both indicating whether the child seat is a forward-facing child seat or a rearward-facing child seat relative to a vehicle seat, and a third pattern disposed on the first region where a child occupant would ordinarily be seated when the child seat is a forward-facing child seat; the system comprising:
   a first detection apparatus configured to detect either the first pattern on the first region of the child seat or the second pattern on the second region of the child seat, said first detection apparatus being further configured to detect the third pattern when the first pattern is detected and a child occupant is not disposed in the child seat,; and
   a controller operably communicating with the first detection apparatus, the controller configured to generate a first signal when the child seat is a forward-facing child seat and the third pattern is detected, a second signal when the child seat is rearward-facing and a third signal when the child seat is forward-facing and the third pattern is not detected.

2. The child seat monitoring system of claim 1, wherein the controller is further configured to generate a second signal when the child seat is rearward-facing child seat.

3. The child seat monitoring system of claim 1, further comprising an airbag control unit operably communicating with the controller, the airbag control unit suppressing operation of an airbag in response to the first signal.

4. The child seat monitoring system of claim 1, wherein the first detection apparatus comprises an electronic camera.

5. The child seat monitoring system of claim 1, wherein the controller is further configured to induce a first light-emitting diode to emit light when the child occupant is disposed in the child seat.

6. The child seat monitoring system of claim 1,
   wherein the controller is further configured to induce a first light-emitting diode to emit light when the child occupant is disposed in the child seat and a second light-emitting diode to emit light when a child occupant is not disposed in the child seat.

7. The child seat monitoring system of claim 1, wherein the controller is further configured to induce an annunciator to emit a first audible sound when a child occupant is disposed in the child seat, the controller further configured to induce the annunciator to emit a second audible sound when the child occupant is not disposed in the child seat.

8. The child seat monitoring system of claim 1, wherein the controller is further configured to induce a liquid-crystal display to display a first message when a child occupant is disposed in the child seat, the controller further configured to induce the liquid-crystal display to display a second message when the child occupant is not disposed in the child seat.

9. The child seat monitoring system of claim 4, further comprising a frame grabber operably communicating with both the controller and the electronic camera, the frame grabber storing a digital image generated by the electronic camera.

10. The child seat monitoring system of claim 4, wherein the first detection apparatus detects the first pattern on the child seat by generating a digital image of the first pattern on the child seat.

11. A method for determining a type of child seat, the child seat having a first region and an opposite second region, the child seat having first and second patterns disposed on the first and second regions, respectively, both indicating whether the child seat is a forward-facing child seat or a rearward-facing child seat relative to a vehicle seat, and a third pattern disposed on the first region where a child occupant would ordinarily be seated when the child seat is a forward-facing child seat, the method comprising:
   detecting at least one of the first pattern on the first region of the child seat and the second pattern on the second region of the child seat;
   determining whether the child seat is a forward-facing child seat based on at least one of the first and second patterns, utilizing a controller; and
   when the child seat is a forward-facing child seat, detecting the third pattern and determining whether a child occupant is not disposed in the child seat based upon detection of the third pattern.

12. The method of claim 11, further comprising:
   inducing a first light-emitting diode to emit light when a child occupant is disposed in the child seat, utilizing the controller; and
   inducing a second light-emitting diode to emit light when the child occupant is not disposed in the child seat, utilizing the controller.

13. The method of claim 11, further comprising generating a first signal when the child seat is the frontward-facing child seat, utilizing the controller.

14. The method of claim 13, further comprising
   receiving the first signal at an air bag control unit; and
   suppressing operation of an air bag based on the first signal, utilizing the air bag control unit.

15. The method of claim 11, further comprising generating a second signal when the child seat is the rearward-facing child seat, utilizing the controller.

* * * * *